UNITED STATES PATENT OFFICE.

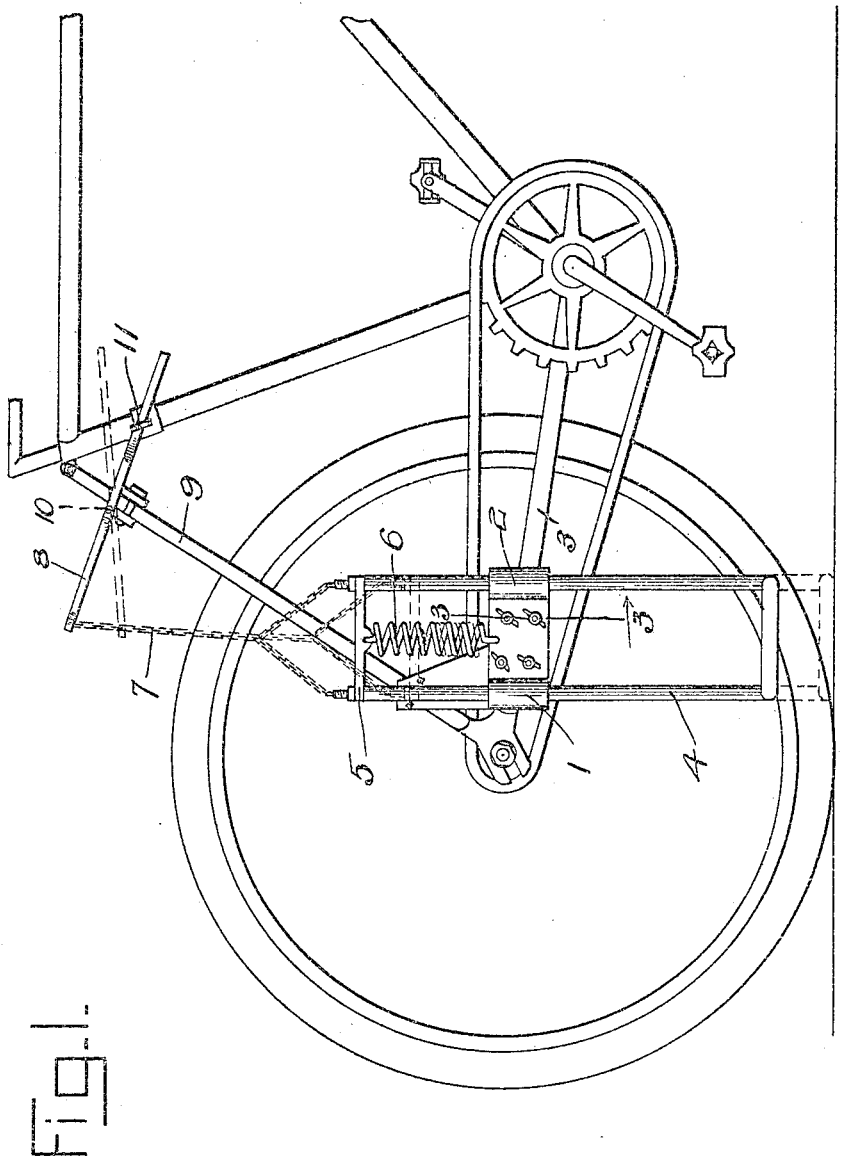

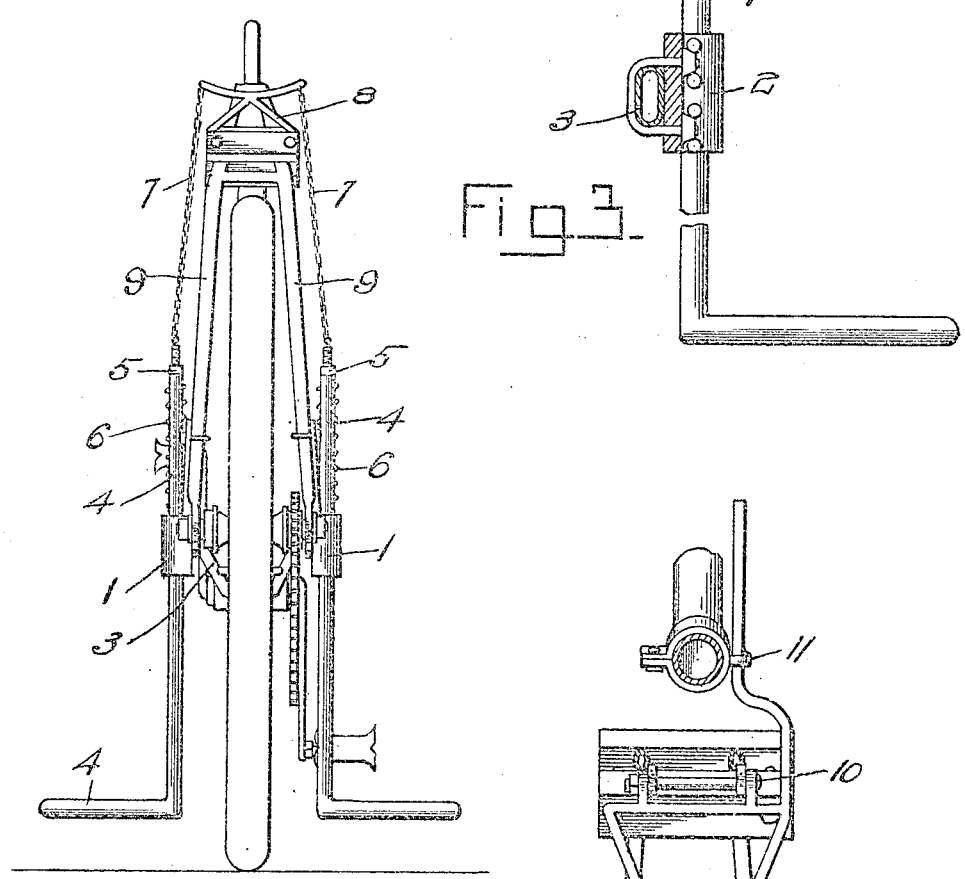

EPHRAIM F. WILLIAMS AND CHARLES W. PATTERSON, OF TAMPA, FLORIDA.

BICYCLE-PROP.

No. 927,620.  Specification of Letters Patent.  Patented July 13, 1909.

Application filed November 14, 1908. Serial No. 462,673.

*To all whom it may concern:*

Be it known that we, EPHRAIM F. WILLIAMS and CHARLES W. PATTERSON, citizens of the United States, residing at Tampa, in the county of Hillsboro and State of Florida, have invented a new and useful Bicycle-Prop; and we do hereby declare the following to be a full, clear, and exact description of the invention, such as will enable others skilled in the art to which it appertains to make and use the same.

The invention relates to a bicycle prop and has for its object to provide a simple, inexpensive and durable device of this character adapted to be attached to a bicycle by which said bicycle will be enabled to stand alone.

With these and other objects in view, the invention consists in the novel arrangement and construction hereinafter described and shown and particularly pointed out in the appended claims.

In the drawings, Figure 1 is a side elevation of our invention, shown applied to a bicycle. Fig. 2 is a rear elevation. Fig. 3 is a detail sectional view on line 3—3 of Fig. 1. Fig. 4 is a detail plan view of the lever.

Referring to the drawings, 1 and 2 designate spaced tubular guides of a metallic plate which is secured to the nearly horizontal bar 3 of the bicycle frame by U-shaped clamping bolts. The bicycle frame is supplied with one of these arrangements on each side. Mounted slidably in each of the tubular guides is a support 4 having its lower end bent outwardly, the upper end of which is provided with a cross piece 5 to which a spring 6 is connected, which spring is also connected with its lower end to the metallic plate out of which the tubular guides are formed. The upper portion of the support 4 is provided with a chain 7 which connects with a lever 8, which lever 8 is pivotally connected to the nearly upright bar 9 as shown at 10. The inner end of the lever 8 is adapted to engage a clip 11 when the bicycle is in operation.

When the rider dismounts, the lever 8 is released from the clip 11 which then releases the spring 6 which draws the L-shaped support 4 downward until it engages the surface of the ground. Possibly the force of the spring may raise the bicycle a trifle above the ground, but this point is immaterial. When the rider desires to remount the bicycle, the inner end of the lever 8 is pressed downward until it engages the clip 11 when the machine is then ready for operation.

It will be seen that our invention is useful, inexpensive and durable and can be readily attached to most any kind of a bicycle.

What is claimed is:—

1. In combination with a bicycle frame, a metallic plate having spaced tubular guides secured to the frame, a support having spaced bars slidable in the guides, a cross bar mounted on the upper end of the support, a spring connected with said cross bar and with the metallic plate, a chain connected with the upper end of the support, a lever connected with the chain and pivotally secured to the bicycle frame, and means for holding the lever in a fixed position on the frame.

2. In combination with a bicycle frame, spaced tubular guides secured on the frame, a support having spaced bars slidable in the guides and having its lower end bent outwardly, a cross head mounted on the upper ends of the bars, a spring connected with said cross bars and the guides adapted to force the support downwardly on the guides, a chain connected with the upper end of the bars, a lever pivotally secured to the bicycle frame connected to the chain, and a clip secured to the bicycle frame for holding the lever in a fixed position thereon.

In testimony whereof we have signed our names to this specification in the presence of two subscribing witnesses.

EPHRAIM F. WILLIAMS.
CHARLES W. PATTERSON.

Witnesses:
  LELAH BRIGHTWELL,
  LEE R. THOMAS.